(12) United States Patent
Minato (10) Patent No.: US 6,925,984 B2
(45) Date of Patent: Aug. 9, 2005

(54) INTERNAL COMBUSTION ENGINE OF PREMIXED CHARGE COMPRESSION SELF-IGNITION TYPE

(75) Inventor: Akihiko Minato, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/948,715

(22) Filed: Sep. 23, 2004

(65) Prior Publication Data

US 2005/0061295 A1 Mar. 24, 2005

(30) Foreign Application Priority Data

Sep. 24, 2003 (JP) ...................... 2003-331971

(51) Int. Cl.$^7$ .............................................. F02B 75/02
(52) U.S. Cl. ...................................... 123/316; 123/295
(58) Field of Search ............................. 123/316, 27 R, 123/295, 305

(56) References Cited

U.S. PATENT DOCUMENTS

| 6,293,246 | B1 | * | 9/2001 | Tanahashi et al. | .......... 123/305 |
| 6,739,295 | B1 | * | 5/2004 | Yamaoka et al. | ........ 123/90.15 |
| 2003/0116124 | A1 | | 6/2003 | Lawrence et al. | .......... 123/305 |
| 2003/0131805 | A1 | | 7/2003 | Yang | ........................... 123/27 |
| 2003/0226528 | A1 | * | 12/2003 | Yamaoka et al. | ........ 123/90.15 |
| 2004/0177830 | A1 | * | 9/2004 | Yamaoka et al. | ............ 123/305 |

FOREIGN PATENT DOCUMENTS

| EP | 1 186 759 A2 | 3/2002 |
| GB | 2 372 537 A | 8/2002 |
| JP | 10-238374 | 9/1998 |
| JP | 2000-130200 | 5/2000 |
| JP | 2001-020784 | 1/2001 |
| WO | 02/079614 A1 | 10/2002 |

* cited by examiner

Primary Examiner—John T. Kwon
(74) Attorney, Agent, or Firm—McCormick, Paulding & Huber LLP (57) ABSTRACT

In an internal combustion engine of a premixed charge compression self-ignition type in which fuel and intake gas are premixed with each other, and the mixture is compressed and self-ignites, target ignition timing determination means (42) to determine a target ignition timing θ based on at least an engine operation state, target compression ratio determination means (41) to determine a target compression ratio (εt) required for the mixture to ignite, and control means (26) to control opening and closing of an intake valve (7) so that an effective compression ratio at the target ignition timing (θ) becomes equal to the target compression ratio (εt) are provided. According to this, the ignition timing of the fuel can be appropriately controlled.

10 Claims, 5 Drawing Sheets

INTERNAL COMBUSTION ENGINE OF PREMIXED CHARGE COMPRESSION SELF-IGNITION TYPE

CROSS REFERENCE TO RELATED APPLICATION

Applicant hereby claims foreign priority benefits under U.S.C. §119 of Japanese Patent Application No. 2003-331971, filed on Sep. 24, 2003, and the content of which is herein incorporated by reference.

BACKGROUND OF THE INVENTION

1. Field of Invention

This invention relates to an internal combustion engine of a premixed charge compression self-ignition type, and in particular, an internal combustion engine of a premixed charge compression self-ignition type in which an ignition timing of fuel can be controlled.

2. Description of the Related Art

In recent years, a premixed charge combustion system has been proposed as a combustion system for a diesel engine. In this system, fuel and intake air are premixed with each other by, for example, advancing fuel injection timing to promote making lean and homogeneous mixture to significantly reduce NOx (oxides of nitrogen) and smoke emission.

However, there has been a problem in this premixed charge combustion system that controlling ignition timing of the mixture is difficult. Namely, in conventional combustion system, since ignition begins during injection of fuel, ignition timing is controllable to some extent by controlling fuel injection timing. However, in the premixed charge combustion system, since ignition begins after fuel injection is completed and a premixing period passes, ignition timing is uncontrollable by fuel injection timing.

Inappropriate ignition timing of the mixture may result in deterioration of thermal efficiency (fuel consumption) and exhaust gas emission. For example, if the ignition timing of the mixture is too early (i.e., before a compression top dead center), this may cause an increase of heat loss, and a NOx generation since the mixture is compressed by a piston after its ignition which results in raising temperature in the cylinder.

Therefore, it has been a subject to appropriately control the ignition timing of the mixture in the internal combustion engine in which the premixed charge combustion is executed. For example, it is described in Japanese laid-open Patent Application No. 2001-20784 to control temperature, pressure, characteristic, etc., of the mixture in order to control the ignition timing. However, it is not described in Patent Application No. 2001-20784 how each of controlled systems is controlled in practice.

SUMMARY OF THE INVENTION

It is an object of this invention to solve the above-mentioned subjects, and to provide an internal combustion engine of a premixed charge compression self-ignition type in which ignition timing of mixture can be appropriately controlled.

In order to attain this object, this invention provides an internal combustion engine of a premixed charge compression self-ignition type in which fuel and intake gas are premixed with each other, and the mixture is compressed and self-ignites, comprising target ignition timing determination means to determine a target ignition timing $\theta$ based on at least an engine operation state, target compression ratio determination means to determine a target compression ratio $\epsilon t$ required for the mixture to ignite, and control means for controlling opening and closing of an intake valve so that an effective compression ratio at the target ignition timing $\theta$ becomes equal to the target compression ratio $\epsilon t$.

Here, the target compression ratio determination means may determine the target compression ratio $\epsilon t$ based on an intake gas temperature $T0$, an ignition temperature $T$ of the fuel, and a ratio of specific heat $\gamma$ of the mixture, from a following equation.

$$\varepsilon_t = e^{\frac{ln(T_0/T)}{\gamma-1}} \qquad (3)$$

Moreover, the internal combustion engine may further comprise; a variable valve timing mechanism to adjust opening and closing timing of the intake valve; volume determination means to determine a volume Ve in a cylinder at the target ignition timing $\theta$; and intake valve opening and closing timing determination means to determine such opening and closing timing of the intake valve that the compression ratio from a start of compression to the target ignition timing $\theta$ becomes equal to the target compression ratio $\epsilon t$, based on at least the target compression ratio $\epsilon t$ and the volume Ve in the cylinder at the target ignition timing $\theta$; wherein the control means may control the variable valve timing mechanism in accordance with the opening and closing timing determined by the intake valve opening and closing timing determination means.

Here, the volume determination means may determine the volume Ve in the cylinder at the target ignition timing $\theta$ based on a clearance volume Vc at a compression top dead center of a piston, a diameter Db of a cylinder bore, a piston stroke 2r, and a length L of a connecting rod, from a following equation.

$$Ve = Vc + \frac{\Pi}{4} \cdot D_b^2 \cdot r \cdot \left[(1-\cos\theta) + \frac{r}{4 \cdot L}(1-\cos 2\theta)\right] \qquad (4)$$

Moreover, the intake valve opening and closing timing determination means may determine the closing timing of the intake valve by carrying out the steps of; determining such a volume Vs in the cylinder at a start of compression that the compression ratio from the start of compression to the target ignition timing $\theta$ becomes equal to the target compression ratio $\epsilon t$, based on the volume Ve in the cylinder at the target ignition timing $\theta$, the target compression ratio $\epsilon t$, and a clearance volume Vc at a compression top dead center of a piston, from a following equation;

$$Vs = Ve \cdot \epsilon_t - Vc \qquad (5)$$

determining a position Xs of the piston at the start of compression based on the volume in the cylinder at the start of compression and a diameter Db of a cylinder bore, from a following equation;

$$X_S = \frac{4 \cdot V_S}{\Pi \cdot D_b^2} \qquad (6)$$

calculating a crank angle corresponding to the position Xs of the piston at the start of compression based on the position Xs of the piston at the start of compression, a length L of a connecting rod, and a piston stroke 2r, from a following equation;

$$As = \cos^{-1}\left(\frac{-L^2 + \sqrt{L^2 + r^2 + 2Lr - 2LX_S}}{r}\right) \quad (7)$$

and determining the crank angle as the closing timing of the intake valve.

Moreover, the internal combustion engine may further comprise; an EGR apparatus to recirculate some of exhaust gas into a combustion chamber; intake air volume detection means to detect intake air volume; intake gas temperature detection means to detect temperature T0 of intake gas sucked into a cylinder; and ratio of specific heat determination means to determine a ratio of specific heat γ of the intake gas based on at least an EGR rate or volume, the intake air volume, and the intake gas temperature T0; wherein the target compression ratio determination means may determine the target compression ratio εt based on the intake gas temperature T0 determined by the intake gas temperature detection means, an ignition temperature T of the fuel, and the ratio of specific heat γ determined by the ratio of specific heat determination means, from a following equation.

$$\varepsilon_t = e^{\frac{\ln(T_0/T)}{\gamma - 1}} \quad (3)$$

Furthermore, the internal combustion engine may further comprise ignition timing detection means to detect an actual ignition timing of the mixture, wherein the control means may compensate the timing of opening and closing of the intake valve performed by the variable valve timing mechanism, based on the actual ignition timing detected by the ignition timing detection means.

The ignition timing detection means may be a cylinder internal pressure sensor to detect a pressure in a combustion chamber.

The ignition timing detection means may be an ion sensor.

The ignition timing detection means may be an acceleration sensor.

DESCRIPTION OF THE PREFERRED EMBODIMENTS

Preferred embodiments of this invention will now be described in detail with reference to the accompanying drawings.

Figure 1:
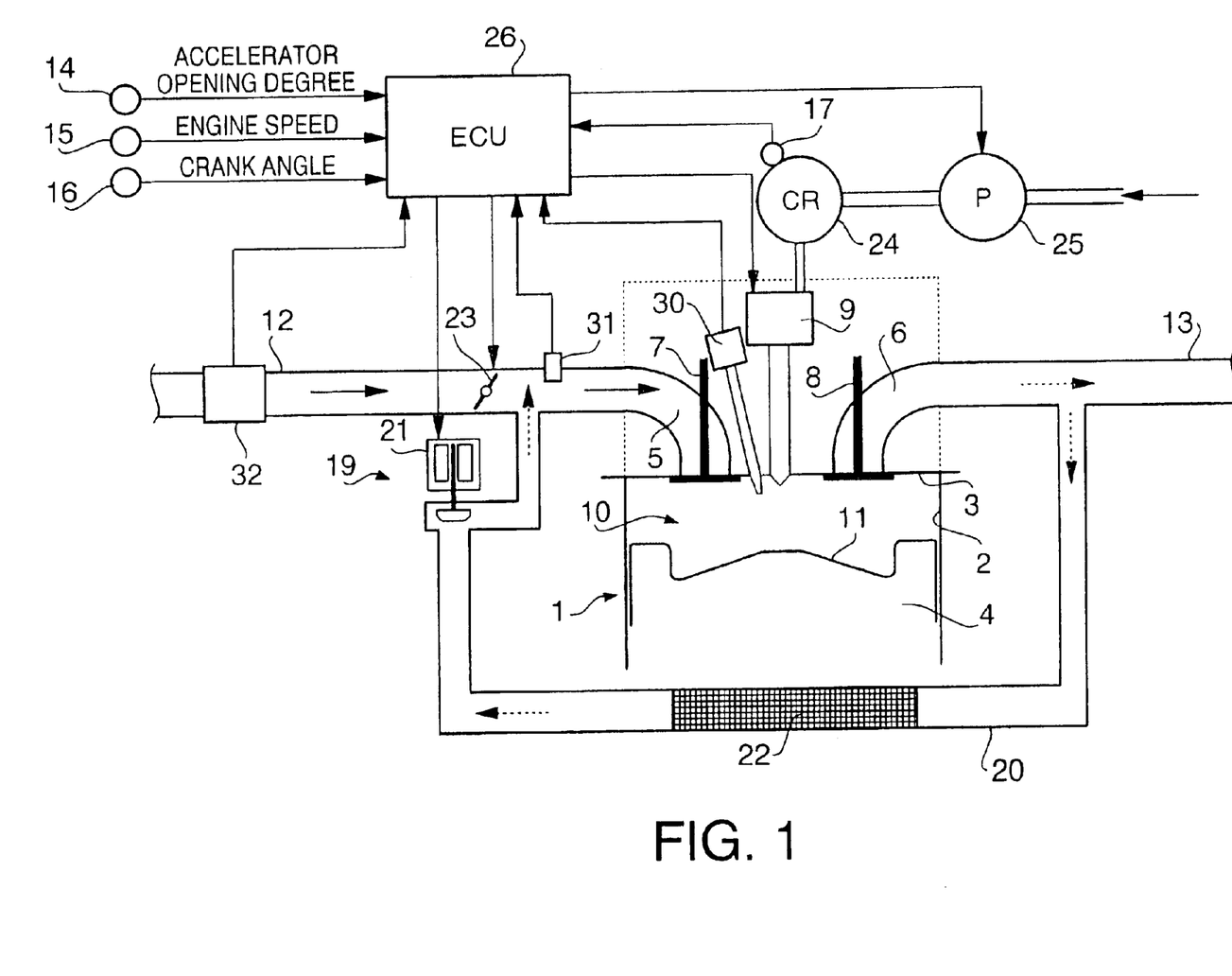
FIG. 1 is a schematic diagram of a premixed charge compression self-ignition type internal combustion engine concerning an embodiment of this invention.

FIG. 1 is a schematic diagram of a premixed charge compression self-ignition type internal combustion engine (simply referred to as engine hereinafter) of this embodiment. Although only one cylinder is illustrated, the engine may be multi-cylinder engine.

A main part of the engine 1 comprises a cylinder 2, a cylinder head 3, a piston 4, intake port 5, an exhaust port 6, an intake valve 7, an exhaust valve 8 and an injector (a fuel injection nozzle) 9. A combustion chamber 10 is defined by the cylinder 2 and the cylinder head 3, and fuel is directly injected from the injector 9 into e combustion chamber 10. A cavity 11 is formed in the top part of the piston 4. The cavity defines a part of the combustion chamber 10. The cavity 11 has a form of toroidal type combustion chamber which has an upwardly protruded bottom center. However, form of the combustion chamber 10 does not suffer any limitation in this invention, and the combustion chamber 10 may be another type such as a reentrant type. The injector 9 is arranged approximately coaxially with the cylinder 2, and injects fuel from its two or more o nozzle holes simultaneously in the shape of radiation. The injector 9 is connected to a common rail 24, and high pressure fuel accumulated in the common rail 24 is always supplied to the injector 9. A high pressure supply pump 5 forcibly supplies the fuel to the common rail 24.

The intake port 5 is connected to an intake pipe 12, and the exhaust port 6 is connected to an exhaust pipe 13.

The engine of this embodiment further comprises an EGR apparatus 19 for recirculating some of the exhaust gas (EGR gas) into the combustion chamber 10. The EGR apparatus 19 comprises an EGR pipe 20 for connecting the intake pipe 12 and the exhaust pipe 13 to each other, an EGR valve 21 for changing passage area of the EGR pipe to control EGR rate, and an EGR cooler 22 for cooling the EGR gas at upstream side of the EGR valve 21. In the intake pipe 12, an intake throttle valve 23 is provided for appropriately throttling intake air flow at upstream side of a connection part of the intake pipe 12 with the EGR pipe 20.

An electronic control unit (referred to as ECU hereinafter) 26 is provided for electronically control the engine. The ECU (control means) 26 detects an engine operation state from various sensors, and controls the injector 9, the EGR valve 21, the intake throttle valve 23, a metering valve (not shown) which adjusts amount of fuel forcibly supplied from the high pressure supply pump 25, and other devices based on the engine operation state. The above-mentioned various sensors includes an accelerator opening degree sensor 14 for detecting an accelerator opening degree, an engine speed sensor 15 for detecting a rotating speed of a crankshaft (not shown) of the engine, a crank angle sensor 16 for detecting a crank angle, a common rail pressure sensor 17 for detecting a fuel pressure in the common rail 24, a MAF (Mass Air Flow) sensor 32 (intake air volume detection means) for detecting a volume of the intake air flowing through the intake pipe 12 at upstream side of a connection part with the EGR pipe 20, an intake gas temperature sensor (intake gas temperature detection means) 31 for detecting temperature of the intake gas which is a mixture of the intake air and the EGR gas and flows through the intake pipe 12 at downstream side of the connection part with the EGR pipe 20. Detection value of each of the sensors is inputted into the ECU 26.

The injector 9 has an electromagnetic solenoid as an electric actuator switched to ON or OFF by the ECU 26. The injector 9 is opened to inject the fuel when the electromagnetic solenoid is ON, while the injector 9 is closed to stop the fuel injection when the electromagnetic solenoid is OFF. The ECU 26 determines a start/stop timing and a quantity of the fuel injection based on parameters representing the engine operation state such as the engine speed and the accelerator opening degree, and turns the electromagnetic solenoid of the injector 9 ON or OFF in accordance with the start/stop timing and the quantity of the fuel injection.

A premixed charge combustion (injection) is performed in the engine of this embodiment. That is, the ECU 26 turns the injector 9 ON before or in advance of a compression top dead center to perform fuel injection. The fuel injected mixes with the intake gas consisting of the intake air and the EGR gas to form the mixture, and subsequently self-ignites and combusts. As mentioned above, according to the premixed charge combustion system, it is promoted to make the mixture lean and homogeneous, and NOx and smoke emission can be significantly reduced. In this invention, it is not always necessary that the mixture is completely homogeneous before its ignition, but it is necessary that the fuel injection is completed before the ignition of the mixture.

The feature of the engine of this embodiment lies in the point that the ignition timing of the mixture in the premixed charge combustion is appropriately controlled. This point will now be explained.

Firstly, an oxidation speed of the mixture (fuel) using normal diesel fuel (an equivalent of JIS (Japanese Industrial Standards) No. 2 gas oil) can be expressed by a following equation (1), $$-\frac{d[\text{Fuel}]}{dt} = A\exp\cdot\left(-\frac{E}{RT}\right)\cdot[\text{Fuel}]^{0.25}\cdot[O_2]^{1.5} \quad (1)$$

where Fuel is a fuel concentration, A is a reaction rate constant, E is an activation energy, R is a gas constant, T is a temperature, and O2 is an oxygen concentration.

Therefore, if property of the fuel, the local fuel concentration (Fuel), and the local oxygen concentration (O2) of the mixture are determined, the oxidation rate (reaction rate) becomes a function of the temperature.

It is known that in case of the normal fuel, cool flame reaction takes place at approximately 760 K (1033° C.), and hot flame reaction takes place at approximately 900 K (1173° C.). Therefore, the self-ignition timing can be controlled by controlling temperature in the cylinder or temperature of the mixture.

Here, the temperature in the cylinder at the compression end can be expressed by a following equation (2), $$T = T_0 \epsilon^{\gamma-1} \quad (2)$$

where T0 is an initial temperature of the mixture (at starting of compression), $\epsilon$ is an effective compression ratio of the engine, and $\gamma$ is a ratio of specific heat of the intake gas (the gas in the cylinder).

That is, the temperature in the cylinder becomes a function of the initial temperature, the effective compression ratio, and the ratio of specific heat. Therefore, by controlling these, the temperature in the cylinder and further the ignition timing of the mixture can be controlled.

Here, the initial temperature T0 is approximately equal to intake air temperature, and is approximately equal to atmospheric temperature in normal operation of the engine. It is thought that controlling the initial temperature T0 to, for example, lower than the atmospheric temperature is difficult. If this is tried, a large scale device may be required.

Next, the ratio of specific heat $\gamma$ varies according to composition of the intake gas (the gas in the cylinder). For example, the ratio of specific heat $\gamma$ can be adjusted by controlling the EGR rate (or the EGR volume) by the EGR apparatus 19. However, ignition timing control by changing the EGR rate is not desirable due to its narrow controllable range and the control delay (actuation delay) of the EGR valve 21. Moreover, changing the EGR rate may cause generation of NOx and smoke.

Figure 2:
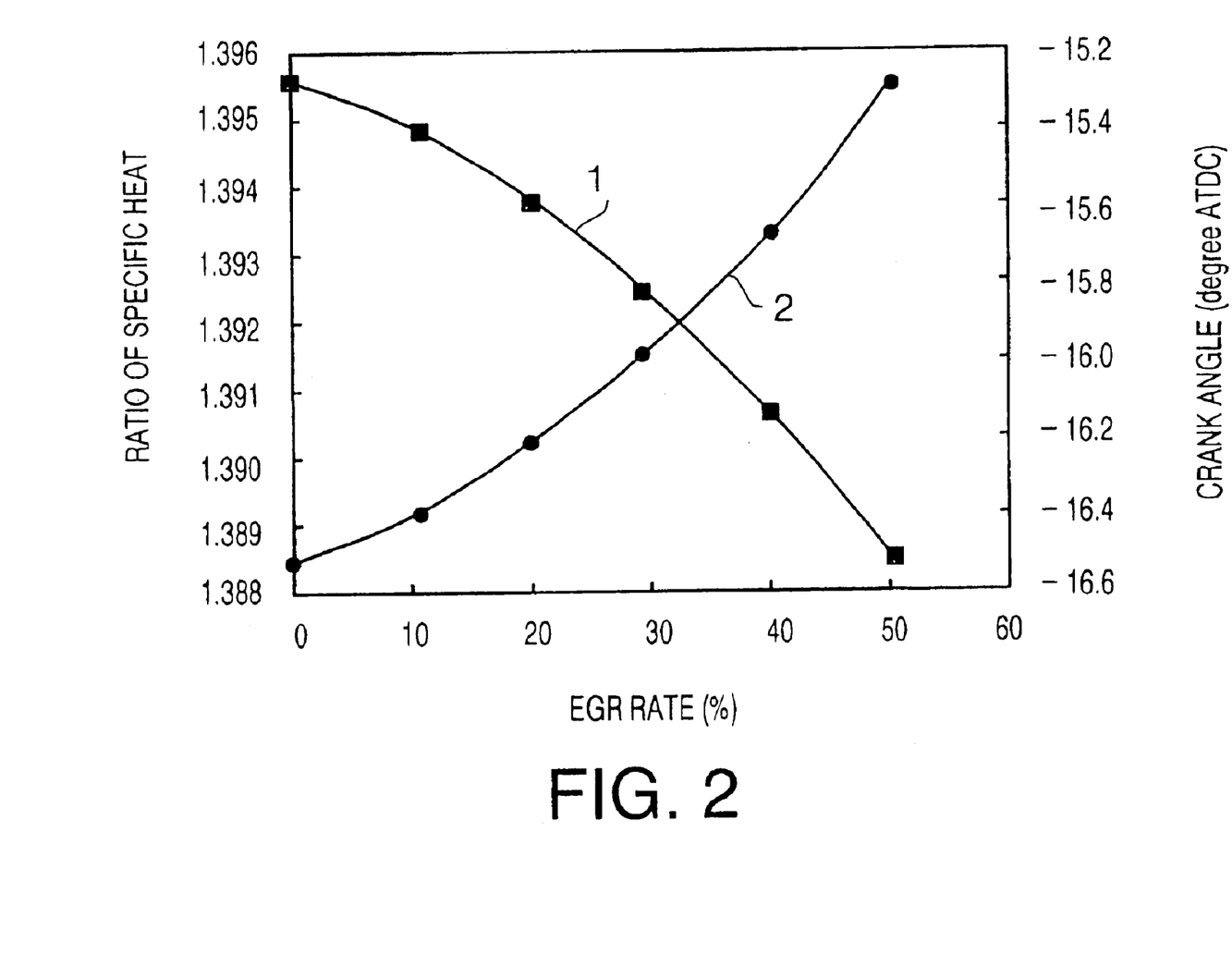
FIG. 2 is a graph showing relation between a ratio of specific heat of mixture and an ignition timing.

FIG. 2 shows relation among the EGR rate, the ratio of specific heat and the ignition timing. In this figure, a horizontal axis is the EGR rate (%), a left vertical axis is the ratio of specific heat of the intake gas, and a right vertical axis is the crank angle (degree ATDC (After Top Dead Center)). A line 1 shows relation between the EGR rate and the ratio of specific heat, and a line 2 shows relation between the EGR rate and the timing when the temperature in the cylinder reaches the ignition temperature of the mixture, i.e., a start temperature of the cool flame reaction (for example, 760 K (1033° C.)). As shown in the figure, the ratio of specific heat of the intake gas decreases as the EGR rate increases. On the other hand, the timing when the temperature in the cylinder reaches the ignition temperature (the start temperature of the cool flame reaction) delays as the EGR rate increases, i.e., the ratio of specific heat of the gas in the cylinder decreases. It is understood from this graph that the ignition timing of the mixture can be controlled by controlling the EGR rate. However, as mentioned above, the controllable range of the ignition timing by controlling the EGR rate is relatively narrow. For example, in the example of FIG. 2, the ignition timing can be controlled only in the range of approximately 1.2 degree CA (Crank Angle), even if the EGR rate is changed in the range of 0–50%.

Therefore, in this embodiment, the temperature in the cylinder T0 is controlled by changing the effective compression ratio $\epsilon$, thereby the ignition timing of the mixture is appropriately controlled.

The compression ratio $\epsilon$ mentioned herein means a compression ratio from the start of compression to the start of ignition of the gas in the cylinder, i.e., an effective compression ratio. One of methods for changing the compression ratio $\epsilon$ is changing the capacity of the combustion chamber itself, as is described in Japanese laid-open Patent Application No. 10-238374 for example. However, according to this method, change of the form of the combustion chamber may cause change of formation state of the mixture, and bad influence on combustion. Therefore, in this embodiment, the effective compression ratio $\epsilon$ is controlled by changing or controlling opening and closing timing of the intake valve 7, particularly closing timing (compression start timing).

The intake valve 7 of this embodiment comprises a variable valve timing mechanism by which the opening and closing timing of the intake valve 7 is arbitrarily adjusted. An example of the variable valve timing mechanism is described in the specification of Japanese Patent Application No. 2001-96029 which was previously filed by the same applicant as this application. This variable valve timing mechanism uses working fluid to open and close the intake valve 7, and an electromagnetic valve switches supplying and discharging of the working fluid. The electromagnetic valve is controlled by the ECU 26. Opening timing and closing timing of the intake valve 7 can be separately controlled by separately controlling supplying and discharging timings of the working fluid by the ECU 26. The variable valve timing mechanism of this invention is not limited to the one which is described in the specification of Japanese Patent Application No. 2001-96029. Other types which can arbitrarily control the opening and closing timing of the intake valve 7 may be applied.

Figure 3:
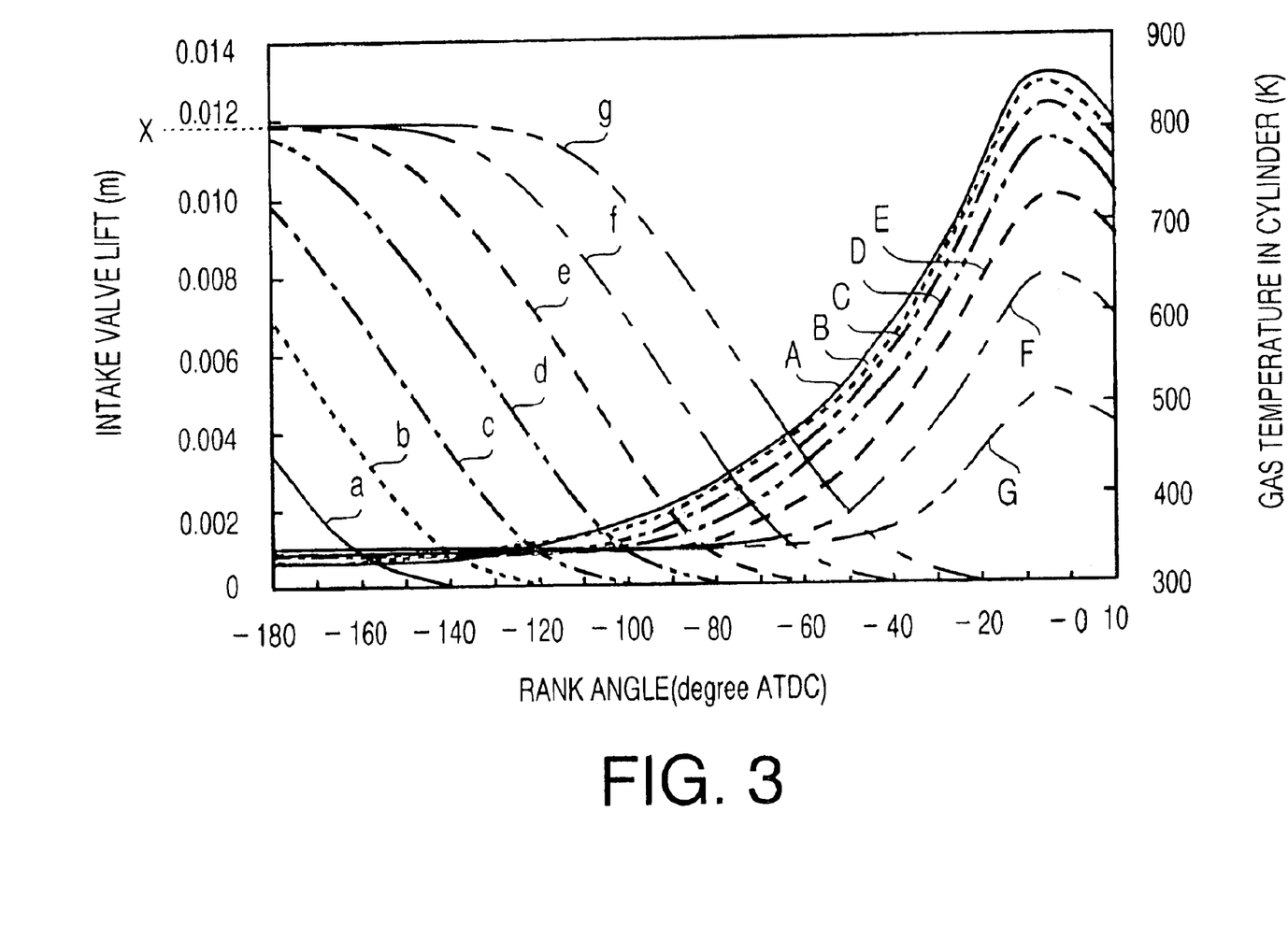
FIG. 3 is a graph showing relation between a closing timing of intake valve and a temperature in the cylinder.

FIG. 3 shows relation between the closing timing of the intake valve (compression start timing) and the temperature in the cylinder.

In this figure, a horizontal axis shows the crank angle (degree ATDC), a left vertical axis shows a valve lift (m) of the intake valve 7, and a right vertical axis shows a temperature (K) of the gas in the cylinder.

Lines with small characters a–g respectively show the valve lifts of the intake valve 7. The intake valve 7 fully opens when its lift is X (approximately 0.0118 m), and completely closes when its lift is zero. The line a indicates the case that the intake valve 7 is completely closed at approximately −140 degree ATDC. The closing timing delays every 20 degree CA for every line from a to g.

Lines with large characters A–G respectively show the temperature in the cylinder, and each of the lines A–G corresponds to the closing timing of the intake valve 7 shown by each of lines a–g. That is, the line A indicates the temperature in the cylinder in case that the intake valve 7 is completely closed at approximately −140 degree ATDC. And also, the lines A to G respectively indicate the temperature in the cylinder in case that the closing timing of the intake valve 7 delays every 20 degree CA as the line goes from A to G. FIG. 3 shows the case when the fuel injection is not performed but the intake air is compressed.

As shown in the figure, the temperature in the cylinder becomes lower as the closing timing of the intake valve 7 becomes later from −140 degree ATDC. And also, timing to reach a certain temperature becomes later. This is because the compression start timing of the gas in the cylinder becomes late when the closing timing of the intake valve 7 becomes late.

Figure 4:
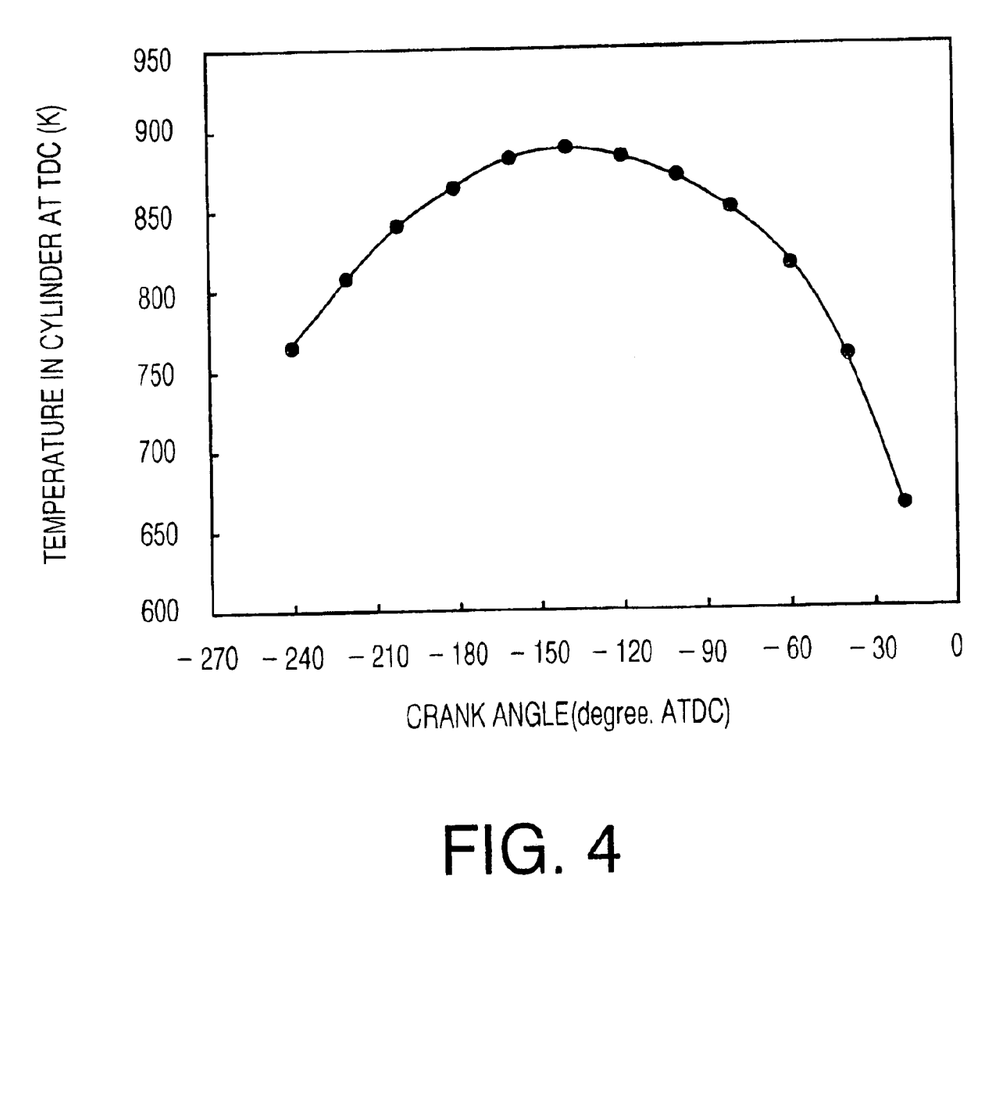
FIG. 4 is a graph showing relation between the closing timing of the intake valve and the temperature in the cylinder at a compression top dead center.

Next, FIG. 4 shows relation between the closing timing of the intake valve 7 and the temperature in the cylinder at the compression top dead center of the piston.

In this figure, a horizontal axis shows the crank angle (degree ATDC) at which the intake valve 7 is completely closed, and a vertical axis shows the temperature in the cylinder (K) at the compression top dead center. This figure shows the case that the completely closing timing of the intake valve 7 is changed by 20 degree CA each from −240 degree ATDC to −20 degree ATDC.

As shown in the figure, the temperature in the cylinder at the compression top dead center becomes lower as the closing timing of the intake valve 7 becomes later from −140 degree ATDC. This is the same as the result shown in FIG. 3. Moreover, it is understood that the temperature in the cylinder at the compression top dead center becomes lower as the closing timing of the intake valve 7 becomes earlier from −140 degree ATDC. That is, if the closing timing of the intake valve 7 is much advanced, the effective compression ratio becomes low and the temperature in the cylinder falls. It is understood from this result that the temperature in the cylinder becomes the highest when the closing timing of the intake valve 7 is set at a certain value (approximately −140 degree ATDC in this embodiment), and that the temperature in the cylinder becomes lower as the closing timing is advanced or delayed from the certain value.

Thus, the temperature in the cylinder can be controlled by changing the closing timing of the intake valve 7. As a result, the ignition timing of the mixture can be controlled.

A method for controlling the ignition timing of the mixture in the engine of this embodiment will now be explained with reference to FIG. 5.

Figure 5:
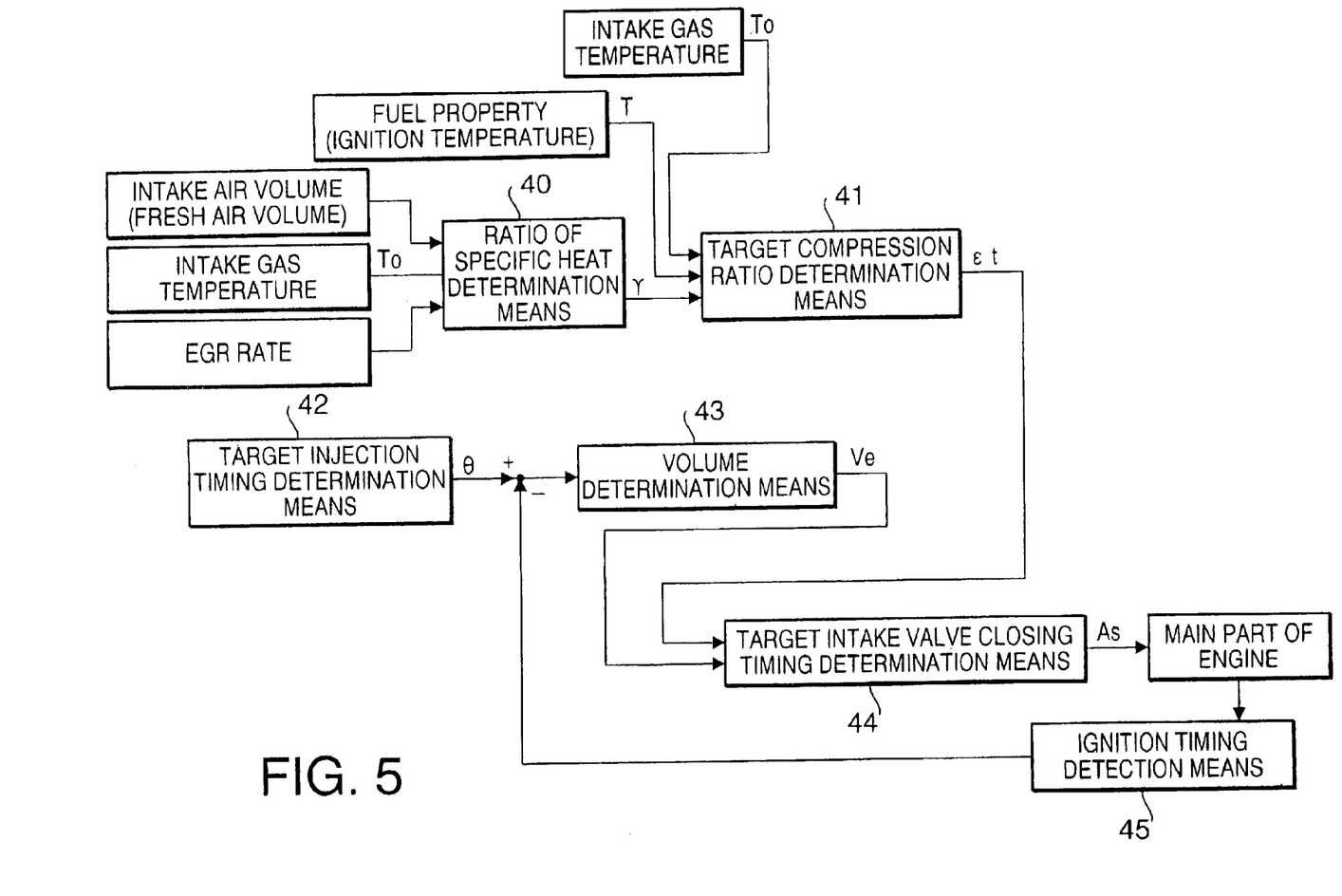
FIG. 5 is a block diagram for explaining a method for controlling the ignition timing in an embodiment of this invention.

As shown in FIG. 5, the ECU 26 of this embodiment comprises ratio of specific heat determination means 40 for calculating and determining the ratio of specific heat γ of the intake gas (the gas in the cylinder), based on at least the intake gas temperature T0 detected by the intake gas temperature sensor 31 (refer to FIG. 1), the intake air volume (fresh air volume) detected by the MAF sensor 32 (refer to FIG. 1), and the EGR rate (or the EGR volume). In this embodiment, the EGR rate is calculated and determined based on the opening degrees of the EGR valve 21 and the intake throttle valve 23 (refer to FIG. 1) and other values. The ratio of specific heat determination means 40 determines the ratio of specific heat γ of the mixture based on composition and volume of the intake gas calculated from the intake gas temperature T0, the intake air volume (fresh air volume) and the EGR rate, by using "Tanishita's equation", "JANAF table" or others which are generally known.

The ECU 26 further comprises target compression ratio determination means 41 for determining a target effective compression ratio εt required for ignition of the mixture, based on the intake gas temperature T0, the ratio of specific heat γ determined by the ratio of specific heat determination means 40, and the property of the fuel (ignition temperature T) inputted into the ECU 26 beforehand.

The target compression ratio determination means 41 calculates the target compression ratio εt according to a following equation (3).

$$\varepsilon_t = e^{\frac{ln(T_0/T)}{\gamma - 1}} \quad (3)$$

The ECU 26 further comprises target ignition timing determination means 42 for determining optimum ignition timing (ignition crank angle) θ based on an operation state such as, at least, the accelerator opening degree and the engine speed. The ECU 26 further comprises volume determination means 43 for determining the volume Ve in the cylinder (combustion chamber) at the target ignition timing θ.

The volume determination means 43 calculates the volume Ve in the cylinder at the target ignition timing θ according to a following equation (4), $$Ve = Vc + \frac{\Pi}{4} \cdot D_b^2 \cdot r \cdot \left[ (1 - \cos\theta) + \frac{r}{4L}(1 - \cos2\theta) \right] \quad (4)$$

where, Vc is a clearance volume at the compression top dead center of the piston, Db is a diameter of the cylinder bore, r is a half of the piston stroke, and L is a length of the connecting rod.

Furthermore, the ECU 26 comprises intake valve closing timing determination means (intake valve opening and closing timing determination means) 44 for determining a target compression start timing (crank angle) required for making the compression ratio from the start of compression to the target ignition timing θ equal to the target compression ratio εt, based on at least the target compression ratio εt and the volume Ve in the cylinder at the target ignition timing θ, and for determining the target compression start timing as a target closing timing (closing crank angle) As of the intake valve. The intake valve closing timing determination means 44 calculates and determine the volume Vs in the cylinder at the start of compression which satisfies the above mentioned condition (i.e. the compression ratio from the start of compression to the target ignition timing θ becomes equal to the target compression ratio εt), based on the volume Ve in the cylinder at the target ignition timing θ, the target compression ratio εt, and the clearance volume Vc, from a following equation (5).

$$Vs = Ve \cdot \varepsilon_t - Vc \quad (5)$$

Next, the intake valve closing timing determination means 44 calculates and determines the position Xs of the piston at the start of compression, based on the volume Vs in the cylinder at the start of compression, and the diameter Db of the cylinder bore, from a following equation (6).

$$Xs = \frac{4 \cdot Vs}{\Pi \cdot D_b^2} \qquad (6)$$

And then, the intake valve closing timing determination means 44 calculates the crank angle corresponding to the position Xs of the piston, based on the length L of the connecting rod, the half of the piston stroke r, and the position Xs of the piston at the start of compression, from a following equation (7), and determines the crank angle calculated as the compression start crank angle As.

$$As = \cos^{-1}\left(\frac{-L^2 + \sqrt{L^2 + r^2 + 2Lr - 2LX_S}}{r}\right) \qquad (7)$$

The intake valve closing timing determination means 44 set the compression start crank angle as the target intake valve closing timing, and the ECU 26 outputs a signal to the variable valve timing mechanism according to the compression start crank angle As.

Thus, in the engine of this embodiment, the target ignition timing θ and the target compression ratio εt are firstly determined, and the closing timing of the intake valve 7 is secondly determined from these parameters. Accordingly, the compression ratio from the start of compression (closing of the intake valve) to the target ignition timing θ becomes equal to the target compression ratio εt, and the mixture ignites at the target ignition timing θ.

The closing timing of the intake valve is adjusted according to change of the target ignition timing θ, and thus the ignition timing is adjusted and controlled. That is, the closing timing of the intake valve 7 is appropriately adjusted so that the actual ignition timing becomes equal to the target ignition timing. Therefore, the ignition timing of the mixture in the premixed charge combustion can always be controlled appropriately, and the bad influence such as deterioration of the thermal efficiency and the exhaust gas caused by inappropriate ignition timing can be avoided. Normally and preferably, the ignition timing of the mixture is set to approximately the compression top dead center of the piston.

Here, as shown in FIG. 5, the ECU 26 of this embodiment comprises ignition timing detection means 45 for detecting the actual ignition timing of the mixture, and the closing timing of the intake valve is compensated based on the actual ignition timing detected by the ignition timing detection means 45.

In this embodiment, as shown in FIG. 1, the ignition timing detection means 45 comprises a cylinder internal pressure sensor 30 which is faced into the combustion chamber 10 to detect pressure in the combustion chamber 10. That is, since the pressure in the combustion chamber 10 rises rapidly when the mixture ignites, the timing when the detection value of the cylinder internal pressure sensor 30 changes (rises) rapidly is judged as the ignition timing. The detection value of the cylinder internal pressure sensor 30 is inputted into the ECU 26, and the ECU 26 judges the ignition timing based on the detection value.

As shown in FIG. 5, the actual ignition timing detected by the ignition timing detection means 45 is compared with the target ignition timing θ, and if there is a difference between the actual ignition timing and the target ignition timing θ, then the closing timing of the intake valve is compensated based on the difference. Thereby, the actual ignition timing is controlled to the target ignition timing θ more precisely.

This invention is not limited to the embodiment described above, but various modifications can be considered.

For example, an ion sensor may be used as the ignition timing detection means, which is provided to face into the combustion chamber 10 and detects ion current flowing in ion generated by ignition-and combustion. An example of the ion sensor is disclosed in, for example, Japanese laid-open Patent Application No. 11-82121. Alternatively, an acceleration sensor provided in the main part of the engine may be used as the ignition timing detection means. That is, vibration of the engine generated by ignition and combustion may be detected by the acceleration sensor to judge the ignition timing of the fuel.

Moreover, the EGR apparatus is not limited to the type shown in FIG. 1, but may be the one which performs so-called internal EGR. In the internal EGR, the EGR pipe is not used, and for example, the exhaust valve is opened during intake stroke to leave the exhaust gas in the cylinder. Various EGR apparatus using burnt gas are applicable.

Moreover, the variable valve timing mechanism is not limited to the one which can separately control the opening timing and the closing timing of the intake valve, but the type which shifts (moves) the opening period itself of the intake valve is also applicable. However, this type of variable valve timing mechanism cannot change the compression ratio of the mixture largely. And also, if the opening period of the intake valve is shifted, valve overlap period may change and thereby combustion state of the mixture may change, or wasteful work may increase. Therefore, it is preferable to apply the variable valve timing mechanism as described above which can separately control the opening timing and the closing timing of the intake valve.

what is claimed is:

1. An internal combustion engine of a premixed charge compression self-ignition type in which fuel and intake gas are premixed with each other, an the mixture is compressed and self-ignites, comprising:

target ignition timing determination means to determine a target ignition timing based on at least an engine operation state;

target compression ratio determination means to determine a target compression ratio εt required for the mixture to ignite; and control means to control opening and closing of an intake valve so that an effective compression ratio ε at the target ignition timing becomes equal to the target compression ratio εt.

2. The internal combustion engine as defined in claim 1, wherein the target compression ratio determination means determines the target compression ratio εt based on an intake gas temperature T0, an ignition temperature T of the fuel, and a ratio of specific heat γ of the mixture, from a following equation:

$$\varepsilon_t = e^{\frac{ln(T_0/T)}{\gamma - 1}}.$$

3. The internal combustion engine as defined in claim 1, further comprising;

a variable valve timing mechanism to adjust opening and closing timing of the intake valve;

volume determination means to determine a volume Ve in a cylinder at the target ignition timing θ; and intake valve opening and closing timing determination means to determine such opening and closing timing of the intake valve that the compression ratio from a start of compression to the target ignition timing θ becomes equal to the target compression ratio εt, based on at least the target compression ratio εt and the volume Ve in the cylinder at the target ignition timing θ;

wherein the control means controls the variable valve timing mechanism in accordance with the opening and closing timing determined by the intake valve opening and closing timing determination means.

4. The internal combustion engine as defined in claim 3, wherein the volume determination means determines the volume Ve in the cylinder at the target ignition timing θ based on a clearance volume Vc at a compression top dead center of a piston, a diameter Db of a cylinder bore, a piston stroke 2r, and a length L of a connecting rod, from a following equation:

$$Ve = Vc + \frac{\Pi}{4} \cdot D_b^2 \cdot r \cdot \left[(1 - \cos\theta) + \frac{r}{4 \cdot L}(1 - \cos2\theta)\right].$$

5. The internal combustion engine as defined in claim 3, wherein the intake valve opening and closing timing determination means determines the closing timing of the intake valve by carrying out the steps of;

determining such a volume Vs in the cylinder at a start of compression that the compression ratio from the start of compression to the target ignition timing θ becomes equal to the target compression ratio εt, based on the volume Ve in the cylinder at the target ignition timing θ, the target compression ratio εt, and a clearance volume Vc at the compression top dead center of a piston, from a following equation;

$$Vs = Ve \cdot \epsilon_t - Vc$$

determining a position Xs of the piston at the start of compression based on the volume in the cylinder at the start of compression and a diameter Db of a cylinder bore, from a following equation;

$$Xs = \frac{4 \cdot Vs}{\Pi \cdot D_b^2}$$

calculating a crank angle corresponding to the position Xs of the piston at the start of compression based on the position Xs of the piston at the start of compression, length L of a connecting rod, and a piston stroke 2r, from a following equation;

$$As = \cos^{-1}\left(\frac{-L^2 + \sqrt{L^2 + r^2 + 2Lr - 2Lx_s}}{r}\right)$$

and determining the crank angle as the closing timing of the intake valve.

6. The internal combustion engine as defined in claim 1, further comprising;

an EGR apparatus to recirculate some of exhaust gas into a combustion chamber;

intake air volume detection means to detect intake air volume;

intake gas temperature detection means to detect temperature T0 of the intake gas to be sucked into a cylinder; and ratio of specific heat determination means to determine a ratio of specific heat γ of the intake gas based on at least an EGR rate or volume, the intake air volume, and t e intake gas temperature T0;

wherein the target compression ratio determination means determines the target compression ratio εt based on the intake gas temperature T0 determined by the intake as temperature detection means, an ignition temperature T of the fuel, and the ratio of specific heat γ determined by the ratio of specific heat determination means, from a following equation;

$$\varepsilon_t = e^{\frac{ln(T_0/T)}{\gamma - 1}}.$$

7. The internal combustion engine as defined in claim 3, further comprising ignition timing detection means to detect an actual ignition timing of the mixture, herein the control means compensates the timing of opening and closing of the intake valve performed by the variable valve timing mechanism, based on the actual ignition timing detected by the ignition timing detection means.

8. The internal combustion engine as defined in claim 7, wherein the ignition timing detection means is a cylinder internal pressure sensor to detect pressure in a combustion chamber.

9. The internal combustion engine as defined in claim 7, wherein the ignition timing detection means is an ion sensor.

10. The internal combustion engine as defined in claim 7, wherein the ignition timing detection means is an acceleration sensor.

* * * * *